Jan. 29, 1952   M. LEPIN ET AL   2,583,742
APPARATUS FOR DIFFUSING LIQUIDS IN VISCOUS MASSES
Filed Dec. 15, 1948

INVENTORS:
MAURICE LEPIN & AUGUSTE BALLY
BY: Francis E. Boyes
ATTORNEY

Patented Jan. 29, 1952

2,583,742

UNITED STATES PATENT OFFICE 2,583,742

APPARATUS FOR DIFFUSING LIQUIDS IN VISCOUS MASSES

Maurice Lepin, Le Peage-de-Roussillon, and Auguste Bally, St.-Maurice-l'Exil, France, assignors to Societe "Rhodiaceta," Paris, France, a company of France Application December 15, 1948, Serial No. 65,455
In France December 18, 1947

1 Claim. (Cl. 23—286)

Rapid and homogeneous reactions may be obtained in media of small viscosity by introducing one or more reactants accompanied by an energetic stirring, for example by using an agitator or by means of a stream of gas. This is not practicable when a reaction has to be produced in a viscous medium on account of the great power which is necessitated for the agitation to be really effective and because of the heat which results from it. This may be partly remedied by turning the reaction vessel itself at a relatively slow speed, for example 15 to 20 revolutions per minute for apparatus of a size from 10 to 25 cubic metres, during the introduction of the reactants. However, even in this case the diffusion of the reactants through the viscous medium is relatively slow and it is practically impossible to obtain a reaction rapidly diffusing throughout the whole mass. Such a rapid reaction, however, would be of great utility in all those cases where the reaction products are susceptible to undesirable secondary reactions, for instance for stopping a reaction which is in full and rapid progress by addition of an appropriate reactant.

It is the object of the present invention to provide a process for producing rapid and homogeneous reactions in viscous or dense media in which at least one of the reactants which take part in the reaction is introduced rapidly and sprayed in a very even fashion substantially on the whole of the surface of the viscous mass to which it is added, the surface of the medium being constantly changed and being for the great part spread out in a thin layer.

Any convenient apparatus may be used to put the process into operation. One particular method consists in using a diffuser of large output for the introduction of the reactants. The angle of the cone of dispersion of the diffuser and the position of the diffuser with respect to the interior of the reaction apparatus are such that the reactants introduced may be sprayed in an even manner on substantially the whole of the surface constantly changed of the viscous mass, particularly at the places where the viscous mass is spread out in a thin layer.

One form of apparatus for carrying out the present invention is illustrated with reference to the accompanying drawings.

Figure 1:
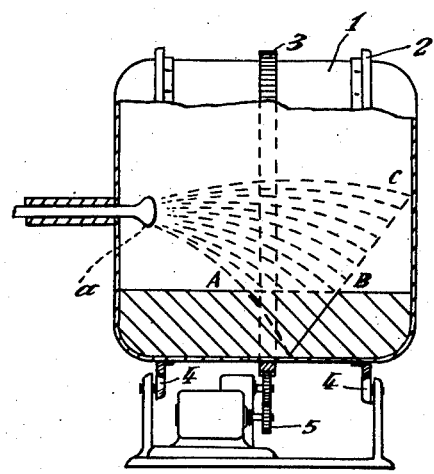
Fig. 1 is a diagrammatic view in section of a rotating reaction vessel in which the diffuser is positioned in the conventional manner.

The apparatus shown in Fig. 1 is shown diagrammatically. It comprises a cylindrical rotating drum body 1, provided with external rails 2 and ring gear 3. The drum body is mounted on rollers 4 and is rotated by means of an electric motor driving the pinion 5 co-operating with the ring gear 3.

The reactants are introduced into the apparatus shown in Fig. 1 by means of a diffuser $a$ of the conventional type, disposed along the axis of rotation of the apparatus; in Fig. 1 the viscous reaction mixture contained in the reaction vessel is represented by the shaded portion. The surface sprayed is small and is situated principally where the viscous mixture is relatively thick as can be seen by looking at Fig. 1 in which the areas sprinkled are indicated by the dotted line A—B—C; the line B—C representing the thin layer of viscous mixture adhering to the peripheral wall, which is contacted by spray.

Figure 2:
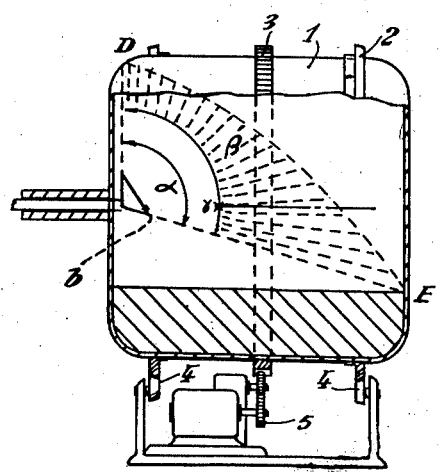
Fig. 2 is a section view of the same apparatus modified in accordance with the present invention.

In Fig. 2 the reactants are introduced by a diffuser $b$ of the kind described above. In the particular case represented in which the length of the apparatus is equal to its diameter the diffuser gives to the liquid projected the form of a cone of which the angle $a$ at the apex is about 112 degrees. The method of determining the size of this angle for each apparatus considered will be given further on.

Figure 3:
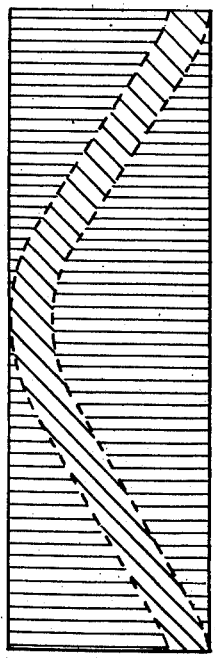
Fig. 3 represents the development of the surface of the peripheral wall of the reaction vessel shown in Fig. 2, the shaded portion represents the surface sprayed at a given instant.

It can be seen in Figs. 2 and 3 that the reactant spray contacts substantially the whole surface of the reaction mixture as indicated by the dotted line DE (Fig. 2) in the course of each rotation, principally in the places where the reaction mixture is spread out thinly by reason of its adhesion to the peripheral wall through its own viscosity and secondly on the surface of the bulk in the bottom of the vessel by spray particles which do not adhere to the viscous layer on the wall.

The angle $a$ at the apex of the dispersion cone may be split up into two angles, the angle $\beta$ between the horizontal axis of the reaction vessel and the top generator of the dispersion cone and the angle $\gamma$ contained between the same axis and the lower generator of the dispersion cone. The angle $\beta$ should be in the neighbourhood of 90° and the best results are obtained when the angle $\gamma$ is such that the lower generator of the dispersion cone cuts the side of the reaction vessel opposite to the diffuser approximately on the middle of intersection line of this side with the surface of the layer of reaction mixture which remains in the bottom of the apparatus. This angle $\gamma$ can be determined either by calculation or by measurement on a drawing. It diminishes with the increase of the ratio of the axial length of the apparatus to the diameter of the apparatus. Naturally it also varies with the thickness of the layer of material in the bottom of the apparatus and also with the viscosity of the viscous mass and with the speed of rotation of the reaction vessel.

The diffuser employed can be of any convenient form such as a cylinder, cone, etc., and can be constructed of any suitable material which is resistant to the action of the reaction mixture; for instance, it may on occasions be made of stainless steel, iron, copper, lead, plastic material or enamelled metal, whichever may be suitable.

By way of example the diffuser can be formed by adding to the mouth of the conduit supplying the reactants a conical nozzle the top of which is placed on the axis of the conduit at a distance of 2 cm. from the end of the conduit.

Example 1

A cylindrical vessel of the kind shown in Fig. 2 having a diameter of 2 metres and an axial length of 3 metres is filled to the extent of a third of its volume with a viscous acetylating solution containing 16% of cellulose acetate at the completion of acetylation. The angle $\gamma$ of the diffuser is 15 degrees and the angle $\beta$ is 90 degrees and the speed of the rotation of the vessel is 8 revolutions a minute. The reaction is to be stopped at a given moment by the addition of 600 litres of 50% acetic acid. The addition is effected by means of the diffuser which has an output of 200 litres per minute and sprays the dilute acetic acid on to the layer of acetylating solution on the peripheral wall. In this way cellulose acetate is obtained which from the point of view of the degree of polymerization and of viscosity is much more homogeneous than is obtained by mixing the reactants in the methods previously known.

Example 2

In the manufacture of viscose rayon, alkali cellulose is prepared, which, after ripening, is transformed to cellulose xanthate by the addition of carbon disulphide. 900 kgs. of alkali cellulose are introduced into a rotating reaction vessel of 3000 litres capacity of the type described. Then 297 kgs. of carbon disulphide are introduced by means of a diffuser situated in the horizontal axis of the reaction vessel. The size of the diffuser is calculated in such a manner as to spray this liquid on the whole of the surface of the viscous mass. The rapid spreading of carbon disulphide over the whole surface of the alkali cellulose gives cellulose xanthate which is much clearer and homogeneous than that obtained by the known methods.

Example 3

In a ball mill of a 1000 litres capacity which contains 200 litres of water and 200 kgs. of a colouring matter insoluble in water, 50 litres of a wetting agent to facilitate the grinding of the colouring matter are introduced in 30 seconds by means of a diffuser fixed in the axis of the ball mill which sprays the wetting agent on the whole of the surface of the mass. By reason of the fact that the wetting agent is sprayed very rapidly and very evenly through the whole of the very sticky mass a paste of colouring matter is obtained which is very smooth and in which the size of the particles does not vary beyond small limits.

The process is not limited to the viscous masses formed by solutions, but applies also to thick suspensions and to layers of pulverized or granular solids. It can be used with advantage with rotating acetylene generators in which quantities of water are introduced just sufficient to transform the calcium carbide into acetylene and dry hydrated lime. In this case the process serves to eliminate overheating and resultant accidents.

The form of the reaction vessel is not limited to cylinders and in certain cases it may be advantageous to use a cubical, rectangular or conical vessel.

What we claim and desire to secure by Letters Patent is:

Apparatus for diffusing a liquid into a viscous mass, comprising a vessel rotatable about a horizontal axis, means for rotating said vessel and a diffuser comprising a conical piece disposed in the horizontal axis of said vessel, the top of said conical piece being placed at a short distance from the conduit supplying the liquid, the upper generator of the cone forming substantially a right angle with said horizontal axis and the lower generator cutting the wall of the vessel opposite to the position of the diffuser at a point corresponding to the level of the reaction mass in normal usage of the apparatus.

MAURICE LEPIN.
AUGUSTE BALLY.

REFERENCES CITED

The following references are of record in the file of this patent:

UNITED STATES PATENTS

| Number | Name | Date |
|---|---|---|
| 659,273 | Williams | Oct. 9, 1900 |
| 1,529,715 | Pratte | Mar. 17, 1925 |
| 1,681,900 | Mendel | Aug. 21, 1928 |
| 1,956,293 | Klein | Apr. 24, 1934 |
| 2,072,375 | McCallum | Mar. 2, 1937 |
| 2,315,203 | Hofmann et al. | Mar. 30, 1943 |

FOREIGN PATENTS

| Number | Country | Date |
|---|---|---|
| 337,149 | Great Britain | Oct. 30, 1930 |
| 528,875 | Great Britain | Nov. 8, 1940 |